(12) United States Patent
Wang et al.

(10) Patent No.: US 12,057,667 B2
(45) Date of Patent: Aug. 6, 2024

(54) ELECTRICAL PLUG WITH REPLACEABLE SURGE PROTECTOR

(71) Applicant: Norman R. Byrne, Ada, MI (US)

(72) Inventors: Yiqi Wang, Troy, MI (US); Aaron G. Lautenbach, Rockford, MI (US); Paul J. Martus, Grand Rapids, MI (US); Gerald N. Vander Till, Byron Center, MI (US); John Miner, Cedar Springs, MI (US)

(73) Assignee: Norman R. Byrne, Ada, MI (US)

( * ) Notice: Subject to any disclaimer, the term of this patent is extended or adjusted under 35 U.S.C. 154(b) by 233 days.

(21) Appl. No.: 17/740,797

(22) Filed: May 10, 2022

(65) Prior Publication Data

US 2022/0368091 A1    Nov. 17, 2022

Related U.S. Application Data (60) Provisional application No. 63/248,174, filed on Sep. 24, 2021, provisional application No. 63/187,072, filed on May 11, 2021.

(51) Int. Cl.
| | |
|---|---|
| *H01R 27/02* | (2006.01) |
| *H01R 13/66* | (2006.01) |
| *H01R 13/68* | (2011.01) |
| *H01R 13/717* | (2006.01) |
| *H01R 24/68* | (2011.01) |
| *H01R 27/00* | (2006.01) |

(Continued)

(52) U.S. Cl.
CPC ......... *H01R 27/02* (2013.01); *H01R 13/6666* (2013.01); *H01R 13/7175* (2013.01); *H01R 24/68* (2013.01); *H02H 9/045* (2013.01); *H01R 13/68* (2013.01); *H01R 27/00* (2013.01); *H01R 2103/00* (2013.01)

(58) Field of Classification Search
CPC .... H01R 13/04; H01R 13/6666; H01R 13/68; H01R 13/684; H01R 13/713; H01R 13/7175; H01R 2103/00; H01R 24/30; H01R 24/68; H01R 24/70; H01R 27/00; H01R 27/02; H02H 9/041; H02H 9/045
See application file for complete search history.

(56) References Cited

U.S. PATENT DOCUMENTS

| | | |
|---|---|---|
| 3,368,110 A | 2/1968 | Taylor |
| 3,452,252 A | 6/1969 | Mapham |

(Continued)

FOREIGN PATENT DOCUMENTS

| | | | |
|---|---|---|---|
| CA | 2011716 A1 | | 9/1991 |
| CN | 102593633 A | * | 7/2012 |

(Continued)

*Primary Examiner* — Jared Fureman
*Assistant Examiner* — Nicolas Bellido
(74) *Attorney, Agent, or Firm* — Gardner, Linn, Burkhart & Ondersma LLP (57) ABSTRACT

An electrical plug provides protection against electrical surges with a replaceable surge protector cartridge that is readily removable and replaceable along an exterior of the plug. Surge protector circuitry in the cartridge can absorb an electrical surge received at the plug from an electrical mains source, and the electrical plug can maintain electrical continuity from plug prongs to an electrical cord both before and after the surge protector has absorbed an electrical surge.

20 Claims, 13 Drawing Sheets

(51) Int. Cl.
*H01R 103/00* (2006.01)
*H02H 9/04* (2006.01)

(56) References Cited

U.S. PATENT DOCUMENTS

| | | | |
|---|---|---|---|
| 3,840,781 A | 10/1974 | Brown | |
| 4,075,676 A | 2/1978 | Phillips, Jr. | |
| 4,089,032 A | 5/1978 | Dell Orfano | |
| 4,191,985 A | 3/1980 | Phillips, Jr. | |
| 4,688,135 A | 8/1987 | Leopold | |
| 4,743,999 A | 5/1988 | Hames | |
| 4,861,286 A | 8/1989 | Fosnaugh | |
| 4,907,118 A | 3/1990 | Hames | |
| 4,947,281 A | 8/1990 | Boteler | |
| 5,190,479 A | 3/1993 | Jordi | |
| 5,304,068 A | 4/1994 | Welch | |
| 5,305,173 A | 4/1994 | Kakuta et al. | |
| 5,384,428 A | 1/1995 | Luu | |
| 5,761,021 A * | 6/1998 | Yu | H01R 13/6666 |
| | | | 361/111 |
| 5,844,763 A | 12/1998 | Grace et al. | |
| 5,943,199 A | 8/1999 | Aromin | |
| 5,984,728 A * | 11/1999 | Chen | H01R 25/006 |
| | | | 439/535 |
| 6,297,450 B1 | 10/2001 | Yu | |
| 6,304,188 B1 | 10/2001 | Subak et al. | |
| 6,340,926 B1 | 1/2002 | Chu | |
| 6,350,139 B1 | 2/2002 | Haag | |
| 6,454,584 B1 | 9/2002 | Milan | |
| 7,140,902 B2 | 11/2006 | Burton | |
| 7,196,885 B2 | 3/2007 | Pierce et al. | |
| 7,223,126 B2 | 5/2007 | Ng | |
| 7,806,716 B2 | 10/2010 | Zahlmann et al. | |
| 7,889,464 B2 | 2/2011 | Chen et al. | |
| 7,924,541 B2 | 4/2011 | Zhang | |
| 8,004,811 B2 | 8/2011 | Chen et al. | |
| 8,011,937 B2 | 9/2011 | Oddsen et al. | |
| 8,021,185 B1 | 9/2011 | Mortun | |
| 8,066,527 B2 | 11/2011 | Mortun | |
| 8,096,826 B1 | 1/2012 | Mortun | |
| 8,154,831 B2 | 4/2012 | Wang et al. | |
| 8,183,962 B2 | 5/2012 | Zhang et al. | |
| 8,197,260 B2 | 6/2012 | Wadsworth | |
| 8,213,139 B2 | 7/2012 | Li | |
| 8,469,730 B2 | 6/2013 | Garb et al. | |
| 8,519,855 B2 | 8/2013 | Hsu | |
| 8,824,110 B2 | 9/2014 | Zou | |
| D730,841 S | 6/2015 | Lee | |
| 9,301,410 B2 | 3/2016 | Rohmer et al. | |
| 9,620,945 B2 | 4/2017 | Rohmer et al. | |
| 9,831,663 B2 | 11/2017 | Lagree et al. | |
| 10,050,393 B1 | 8/2018 | Calabrese | |
| 10,103,530 B2 | 10/2018 | Rohmer et al. | |
| 10,170,265 B2 | 1/2019 | Li et al. | |
| 10,270,235 B2 | 4/2019 | Rohmer et al. | |
| 10,541,101 B1 | 1/2020 | Yang et al. | |
| 10,644,438 B2 | 5/2020 | Li et al. | |
| 10,770,844 B2 | 9/2020 | Nie et al. | |
| 10,811,871 B2 * | 10/2020 | Gondor | H02H 9/042 |
| 10,862,286 B2 | 12/2020 | Rohmer et al. | |
| 10,892,583 B2 | 1/2021 | Chan | |
| 2005/0105235 A1 | 5/2005 | Yu | |
| 2006/0056126 A1 | 3/2006 | Meltzer | |
| 2009/0225486 A1 | 9/2009 | Wadsworth | |
| 2011/0223803 A1 | 9/2011 | Mortun | |
| 2012/0161973 A1 * | 6/2012 | Hsu | H01R 25/003 |
| | | | 340/584 |
| 2016/0344182 A1 * | 11/2016 | Gondor | H02H 9/005 |
| 2018/0358804 A1 | 12/2018 | Pelegris et al. | |

FOREIGN PATENT DOCUMENTS

| | | |
|---|---|---|
| CN | 210779107 U | 6/2020 |
| DE | 3840198 A1 | 5/1990 |
| DE | 20309640 U1 | 9/2003 |
| DE | 202006005689 U1 | 7/2006 |
| EP | 867896 A1 | 9/1998 |
| EP | 0908973 A2 | 4/1999 |
| FR | 2728417 A1 | 6/1996 |
| GB | 2271883 B | 11/1996 |
| JP | 10125423 A | 5/1998 |
| TW | M351516 U | 2/2009 |
| WO | 98/56079 | 12/1998 |

* cited by examiner

ELECTRICAL PLUG WITH REPLACEABLE SURGE PROTECTOR

CROSS REFERENCE TO RELATED APPLICATION

The present application claims the benefit of U.S. provisional application Ser. No. 63/248,174, filed Sep. 24, 2021 and claims the benefit of U.S. provisional application Ser. No. 63/187,072, filed May 11, 2021, both of which are hereby incorporated by reference in their entireties.

FIELD OF THE INVENTION

The present invention relates to electrical power plugs for insertion into electrical receptacles and providing power to electrical devices.

BACKGROUND OF THE INVENTION

Electrical plugs are commonly used at the power-receiving ends of electrical cords used to power a myriad of devices and appliances. Electrical plugs that are designed to receive high voltage AC electrical power (typically 110V AC or 220V AC) from an electrical mains source are sometimes subject to electrical surges due to lightning strikes, surges from the electrical generator or other source, or electrical accidents during service activities or other events. Such electrical surges have the potentially to permanently damage electrical devices receiving power from a plug, unless a surge protector is provided. Surge protectors are commonly incorporated into power strips having a conventional plug, a length of flexible cord, and a plurality of outlet receptacles for receiving plugs of electrical devices or appliances. If an electrical surge is received through a surge-protected power strip's cord, the surge protector absorbs the surge and may be rendered unable to provide electrical power at its receptacles, but the power strip is typically less costly to replace than the devices or appliances that it is designed to protect.

SUMMARY OF THE INVENTION

The present invention provides an electrical plug with a surge protector cartridge that is readily replaced in the event that it is damaged by absorbing an electrical surge. After an electrical surge damages the surge protector, the electrical plug may continue to convey electrical power to an electrical device or appliance to which it is connected, but without further surge-absorbing capability, or reduced surge-absorbing capability. In that case the electrical plug should be serviced by replacing the damaged surge protector cartridge with a new or serviceable cartridge so that the plug can again provide electrical surge protection. Optionally, a light or other indicator provides status information for the plug and surge protector.

These and other objects, advantages, purposes and features of the present invention will become apparent upon review of the following specification in conjunction with the drawings.

DETAILED DESCRIPTION OF PREFERRED EMBODIMENTS

Figure 1:
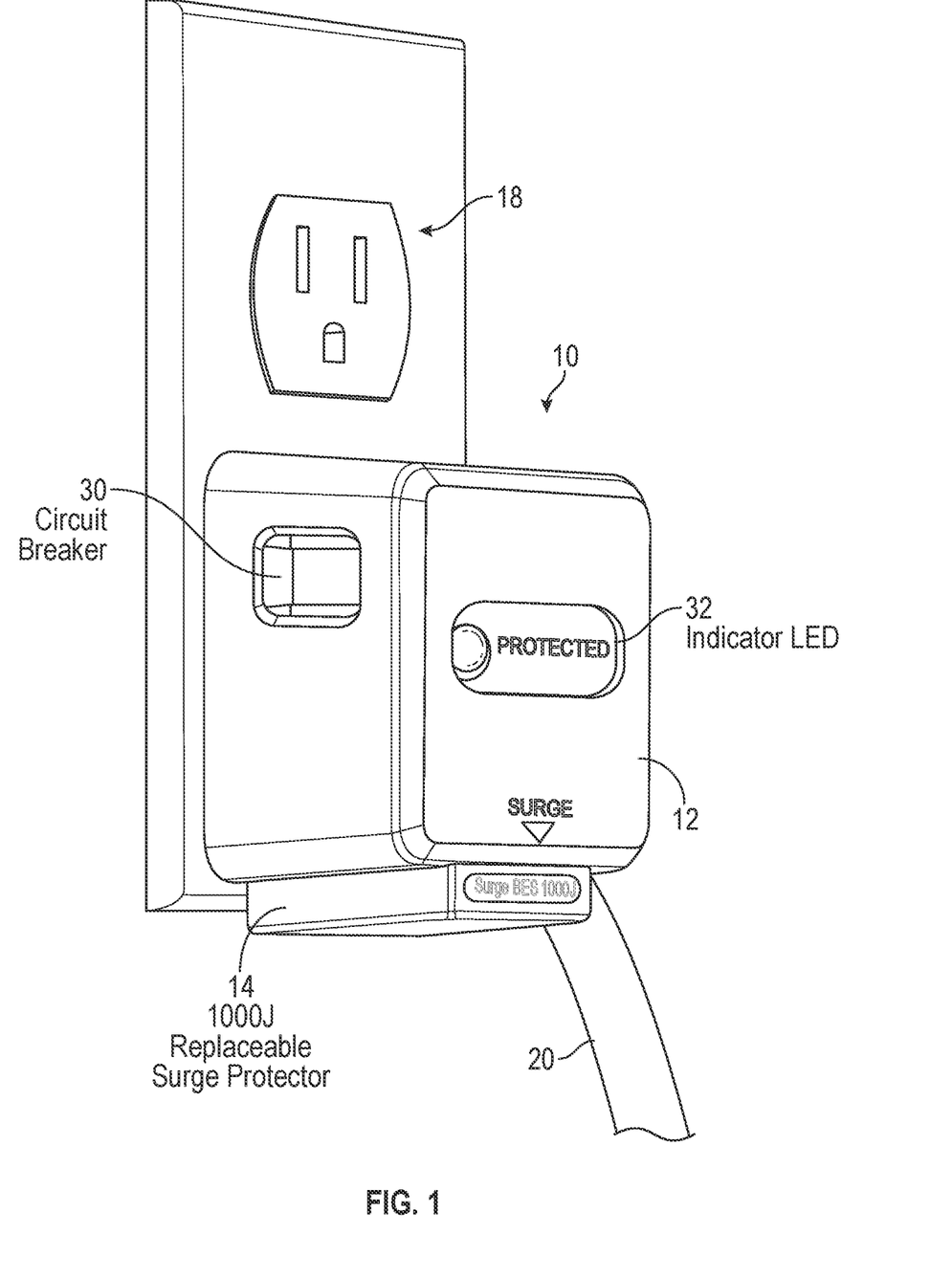
FIG. 1 is a perspective view of an electrical plug with replaceable surge protector in accordance with the present invention.
Figure 2:
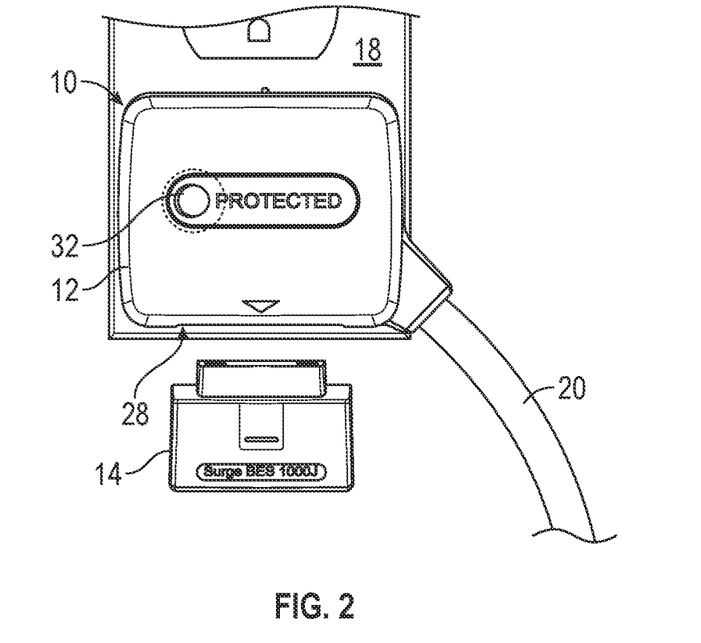
FIG. 2 is a front elevation view of the electrical plug with replaceable surge protector of FIG. 1, with the surge protector shown separated from the plug housing.
Figure 3:
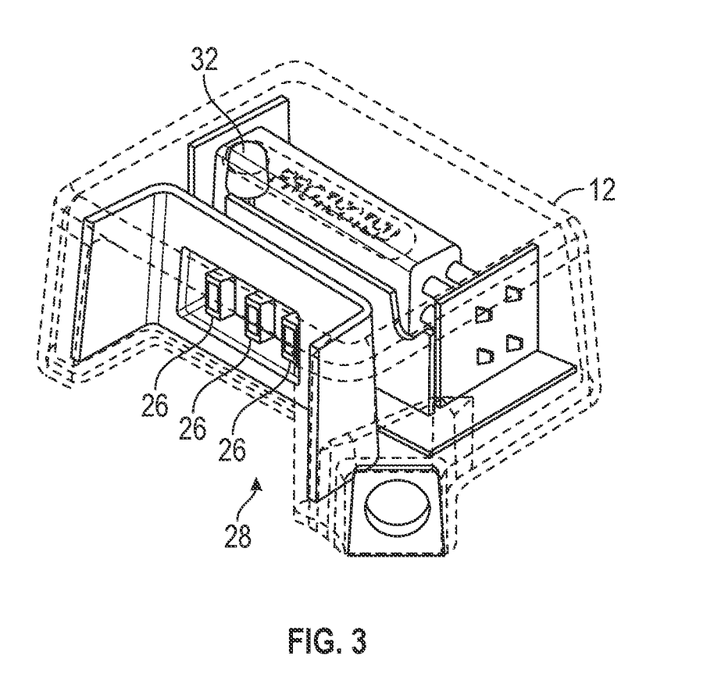
FIG. 3 is a bottom perspective view of the plug housing shown in partial transparency to reveal internal components.
Figure 4:
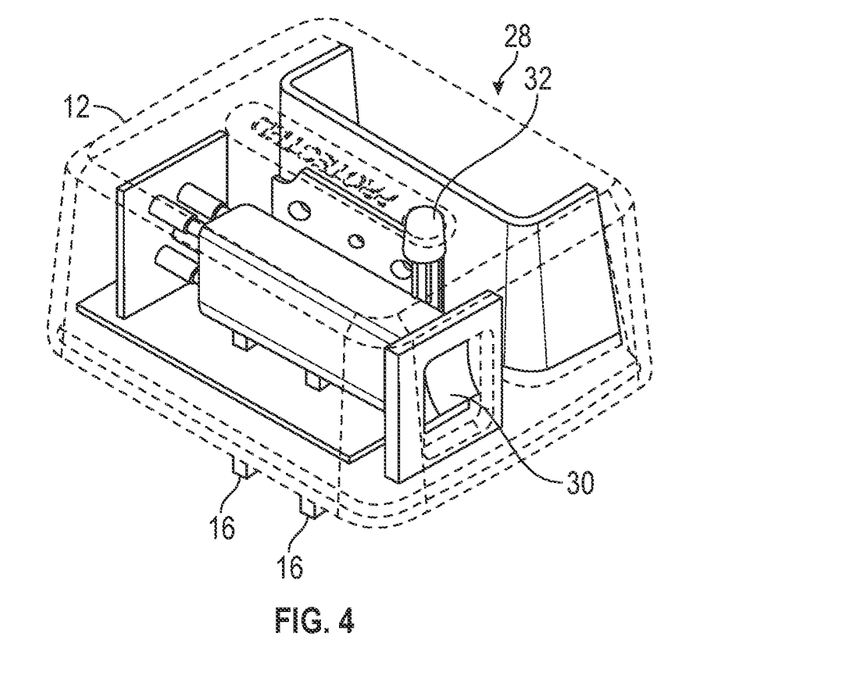
FIG. 4 is a top perspective view of the plug housing of FIG. 3.
Figure 5:
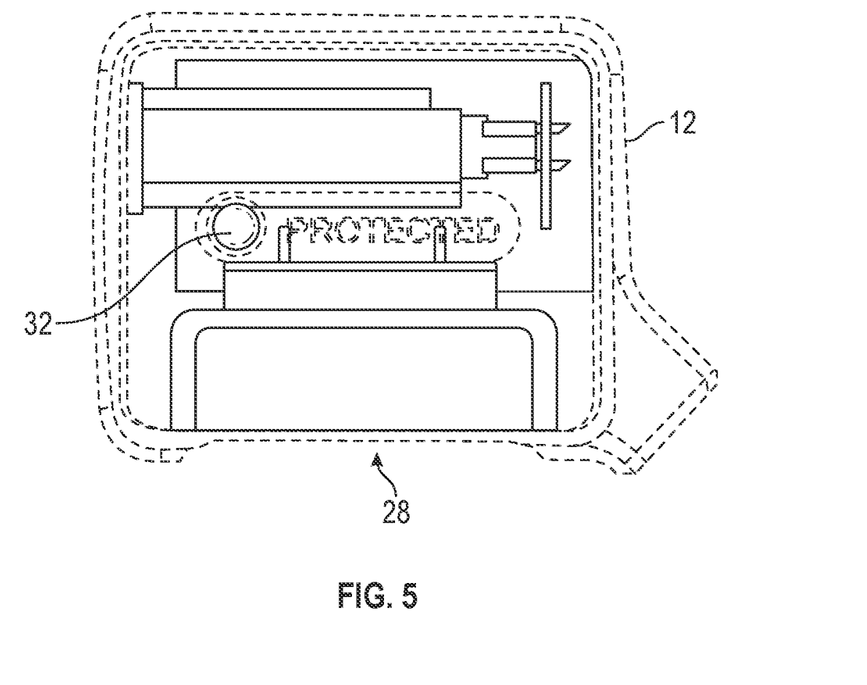
FIG. 5 is a front elevation view of the plug housing of FIG. 3.

Referring now to the drawings and the illustrative embodiments depicted therein, an electrical plug assembly 10 includes a main plug housing 12 and a replaceable surge protector cartridge 14, such as shown in FIGS. 1 and 2. Main plug housing 12 has at least two electrical prongs 16 extending outwardly therefrom (FIG. 4) for engagement with an electrical receptacle 18 as shown in FIGS. 1 and 2. An electrical cord 20 extends outwardly from the plug housing 12 and is in electrical communication with the electrical prongs 16. The electrical cord 20 may be terminated at its opposite end with substantially any desired receptacle, such as a NEMA 5-15 receptacle, an IEC C5, C7, or C13 connector commonly used for desktop computers, computer monitors, and appliances, or the like. The electrical cord 20 may also terminate in bare wires 21 (FIG. 20) or individual terminals for later coupling to terminals at an electrical appliance or device. Electrical plug assembly 10 therefore provides restorable surge protection for any device or electrical consumer receiving power via electrical cord 20. Because surge protector cartridge 14 is replaceable, electrical plug assembly 10 is suitable for permanent installation at an electrical device, without need for a separate surge protector strip or circuitry with its own plug and receptacle(s).

Figure 6:
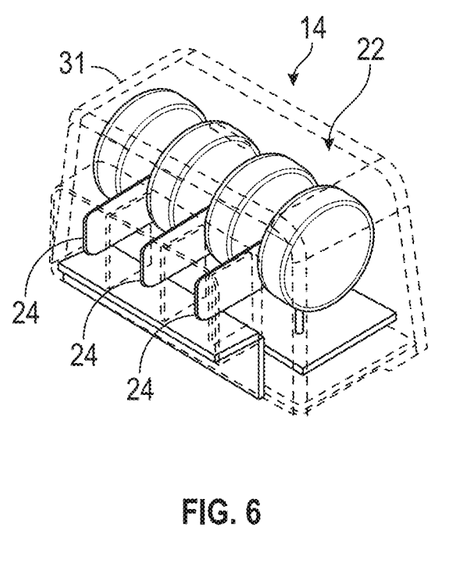
FIG. 6 is a top perspective view of the surge protector shown in partial transparency to reveal internal components.
Figure 7:
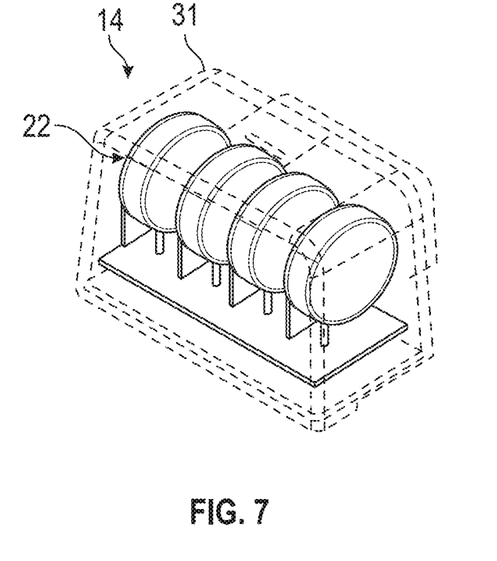
FIG. 7 is a bottom perspective view of the surge protector of FIG. 6.
Figure 8:
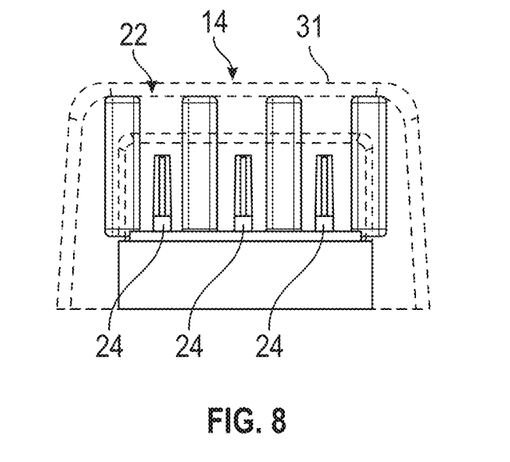
FIG. 8 is a top plan view of the surge protector of FIG. 6.
Figure 9:
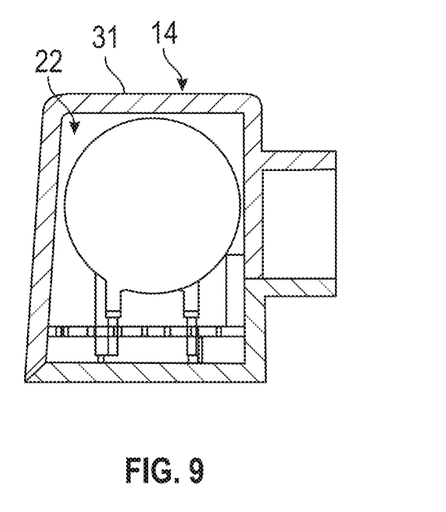
FIG. 9 is a side sectional view of the surge protector.
Figures 10, 11, 12, 13:
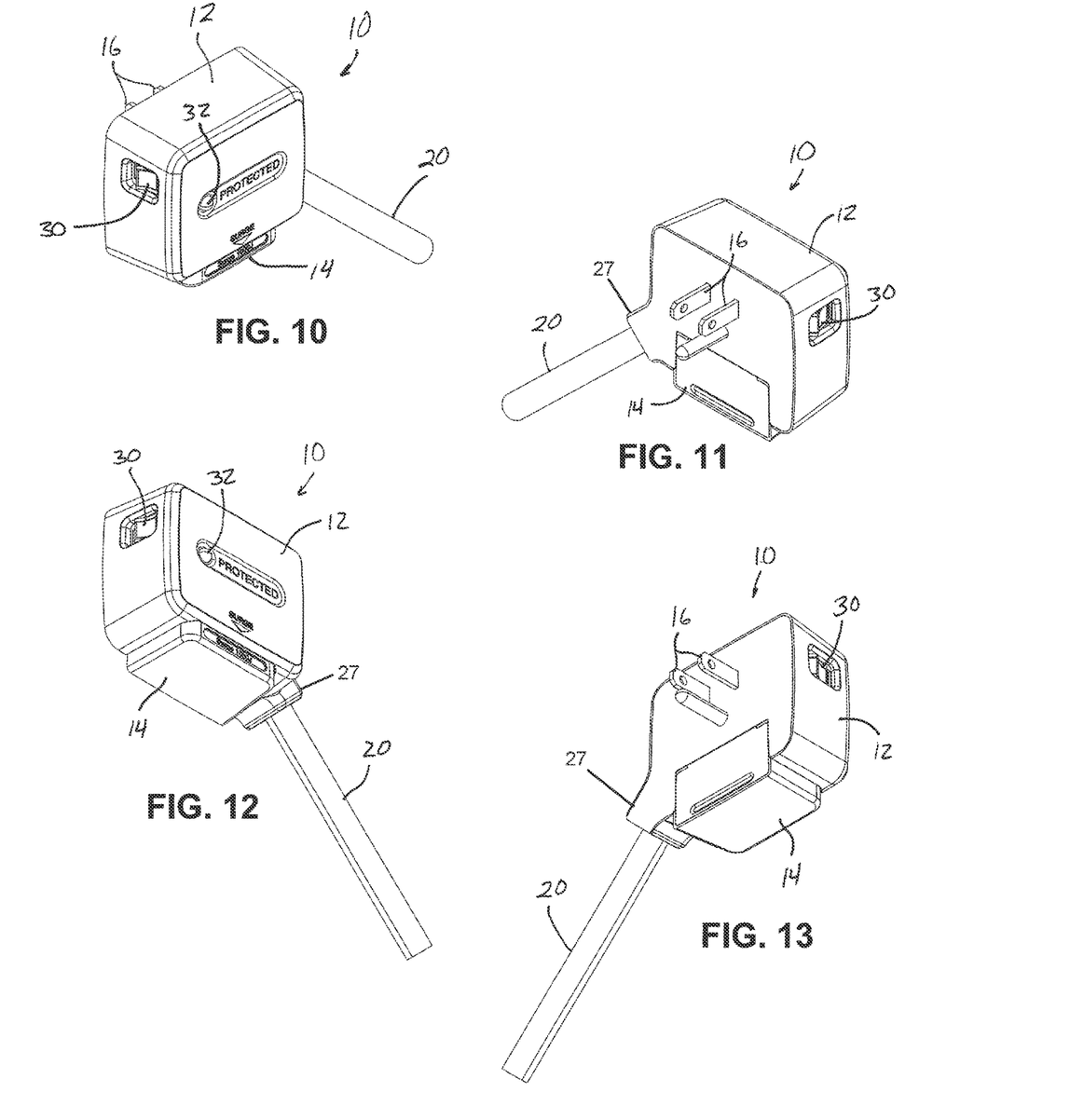
FIGS. 10-13 are perspective views of the electrical plug with replaceable surge protector of FIG. 1.
Figures 14, 15:
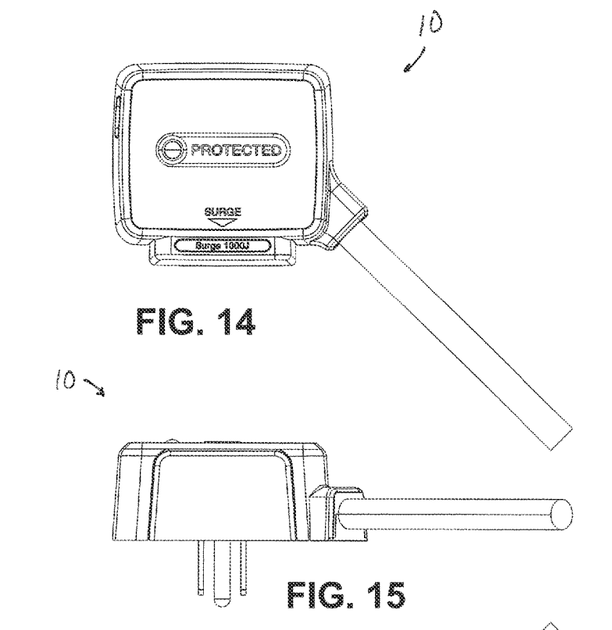
FIGS. 14-19 are plan and elevation views of the electrical plug with replaceable surge protector.
Figure 16:
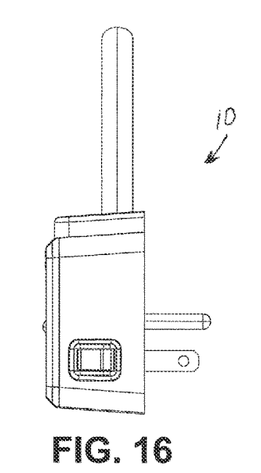
Figure 17:
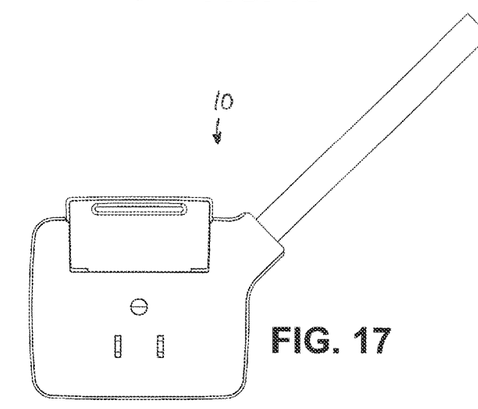
Figure 18:
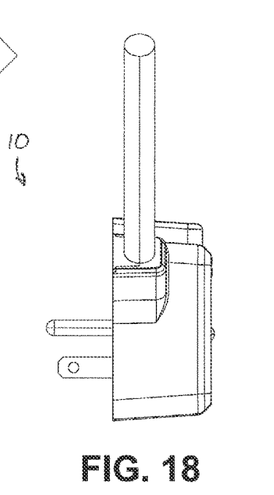
Figure 19:
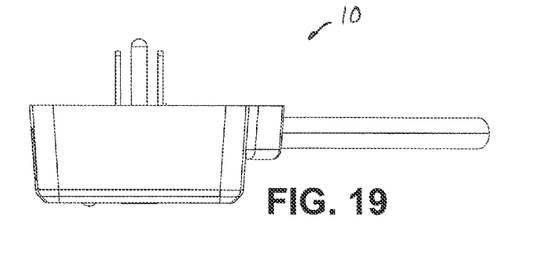

Surge protector cartridge 14 includes a two-piece surge protector housing 31 (FIGS. 1, 2, and 6-9), surge protector circuitry 22 (FIGS. 6-9) disposed in the surge protector housing 31, and a plurality of surge protector contacts 24 (FIGS. 6 and 8) in electrical communication with the surge protector circuitry 22. Surge protector contacts 24 engage corresponding electrical contacts 26 inside a recess 28 defined by main plug housing 12 when surge protector cartridge 14 is inserted into recess 28. Surge protector circuitry 22 will absorb an electrical surge at the electrical prongs 16 and conveyed via electrical contacts 26 and surge protector contacts 24. Electrical continuity can be maintained from electrical prongs 16 to electrical cord 20 both before and after the surge protector circuitry 22 has absorbed an electrical surge. Optionally, circuitry inside main plug housing 12 is configured so that electrical continuity is maintained from electrical prongs 16 to the electrical power output cord 20 even after removal of the surge protector cartridge 14 from the cavity 28.

Figure 20:
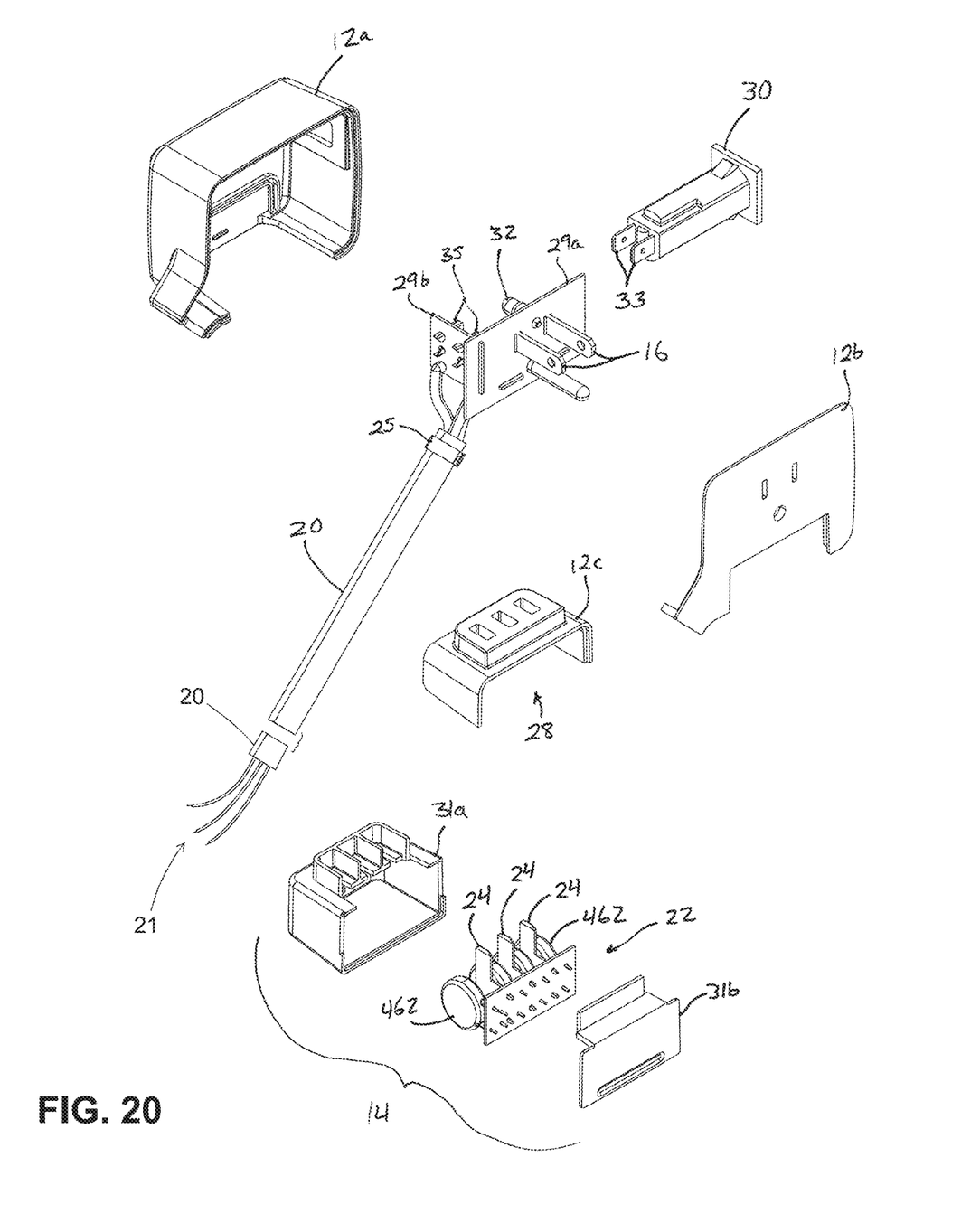
FIGS. 20-22 are exploded perspective views of the electrical plug with replaceable surge protector.
Figure 21:
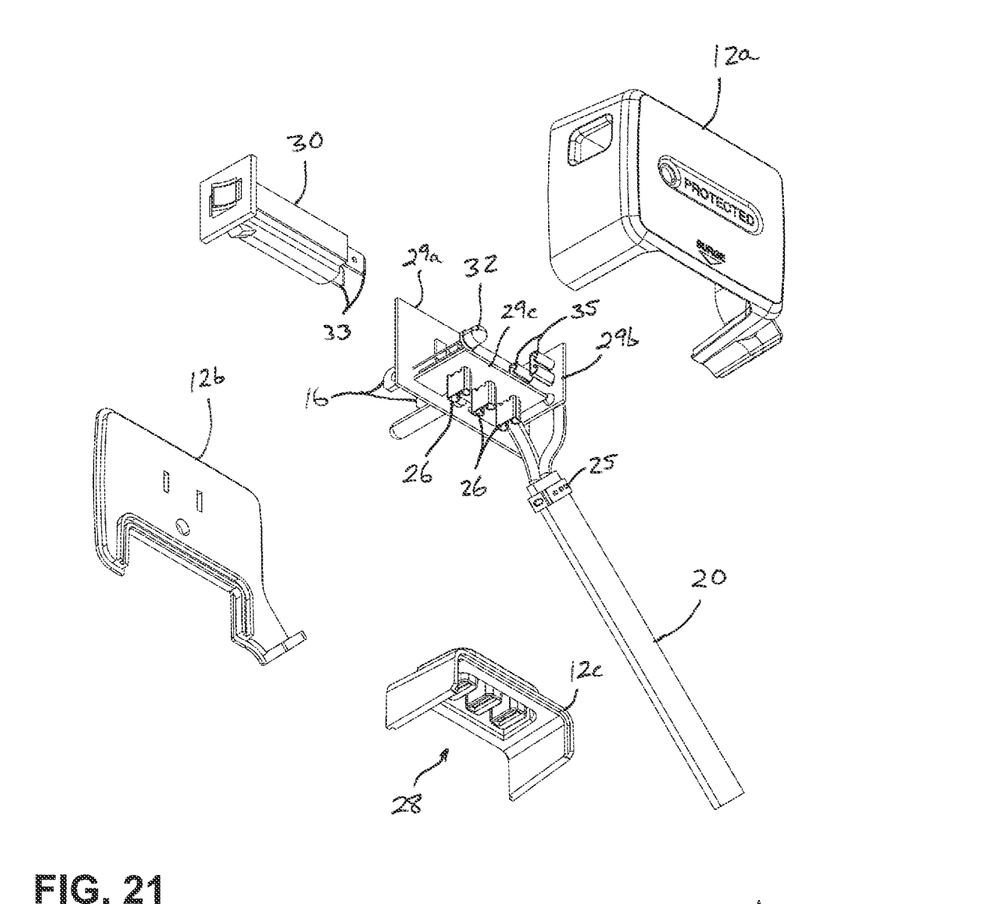
Figure 22:
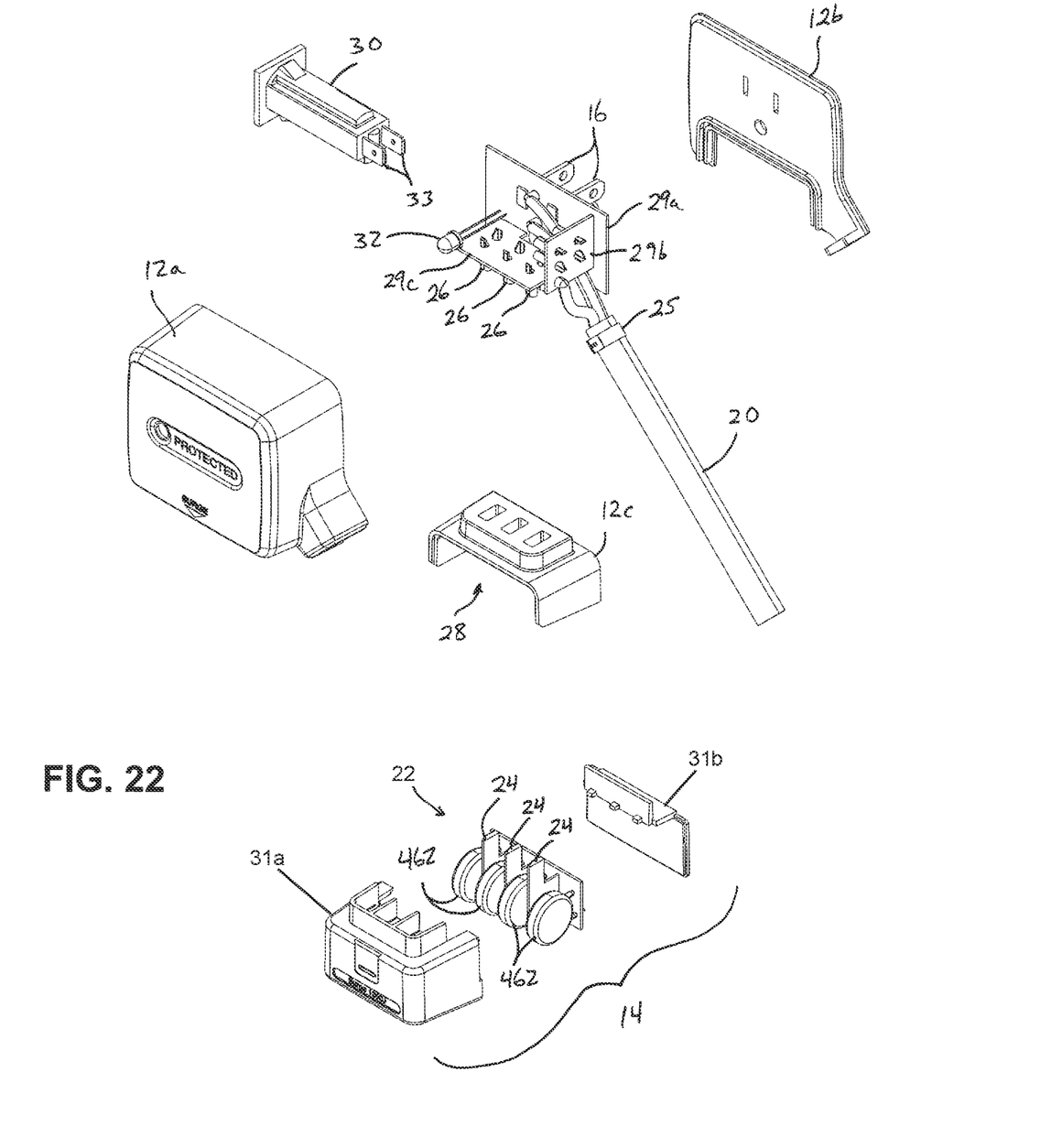
Figures 23, 24, 25, 26, 27:
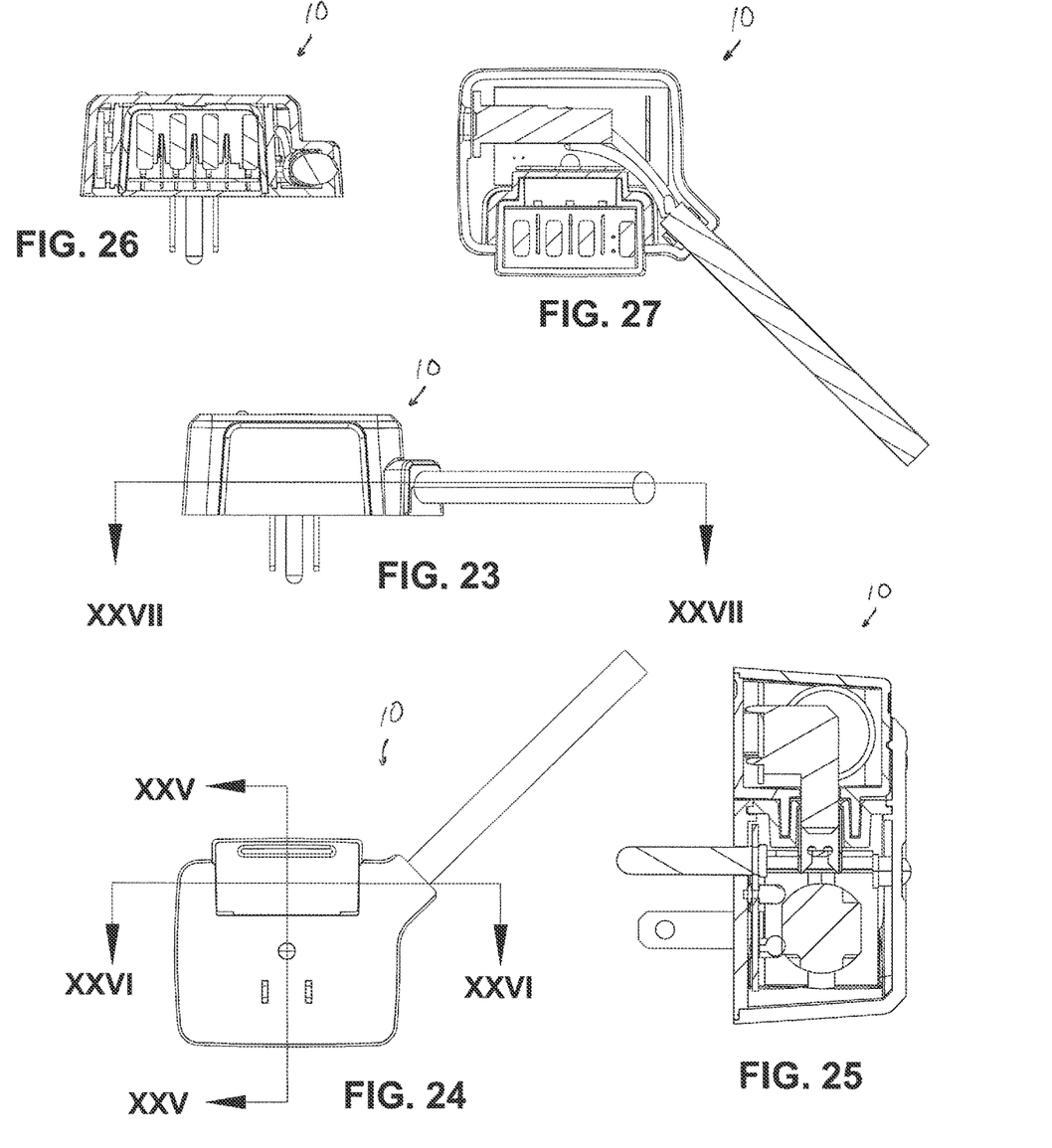
FIG. 23 is a bottom plan view of the electrical plug with replaceable surge protector.
FIG. 24 is a rear elevation view of the electrical plug with replaceable surge protector.
FIG. 25 is a side sectional view taken along Section Line XXV-XXV in FIG. 24.
FIG. 26 is a bottom sectional view taken along Section Line XXVI-XXVI in FIG. 24.
FIG. 27 is a front sectional view taken along Section Line XXVII-XXVII in FIG. 23.
Figure 28:
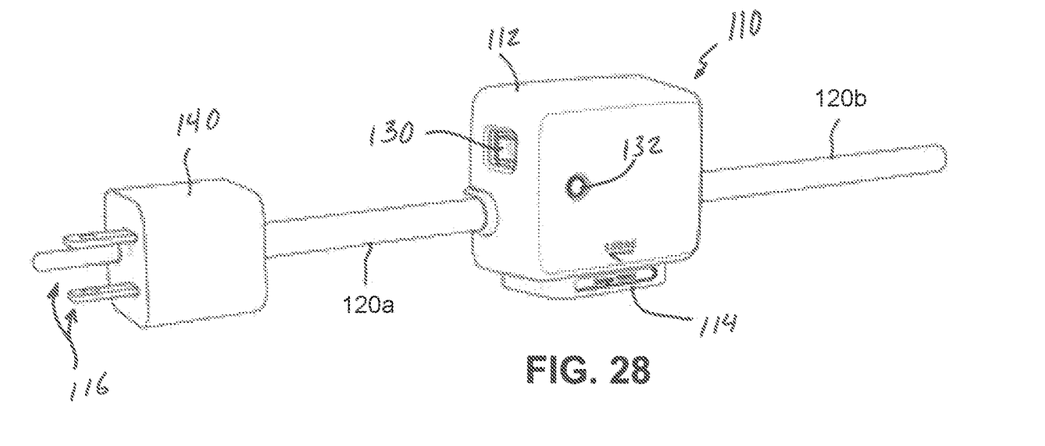
FIG. 28 is a front perspective view of an electrical plug and cord section with in-line surge protector in accordance with the present invention.
Figure 29:
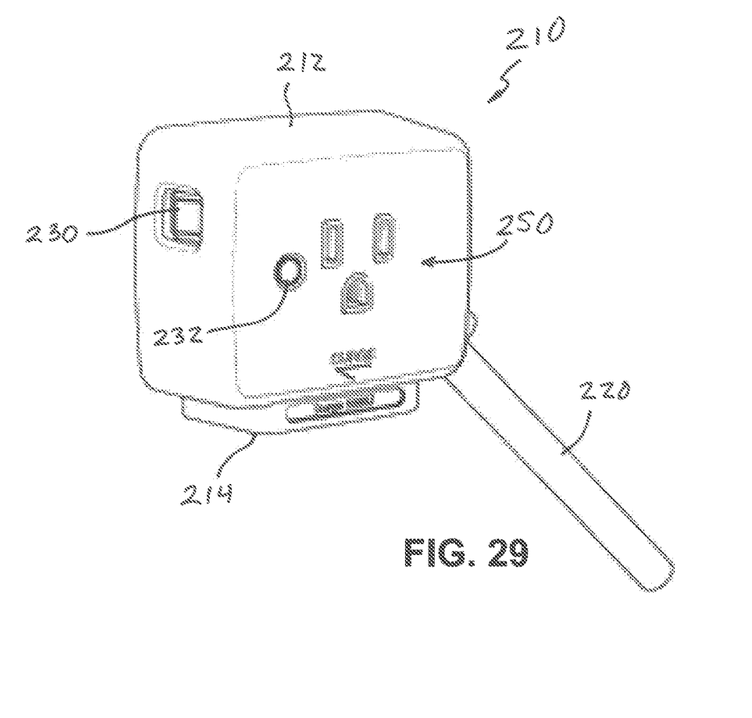
FIG. 29 is a front perspective view of an electrical plug with pass-through receptacle and replaceable surge protector in accordance with the present invention.
Figure 30:
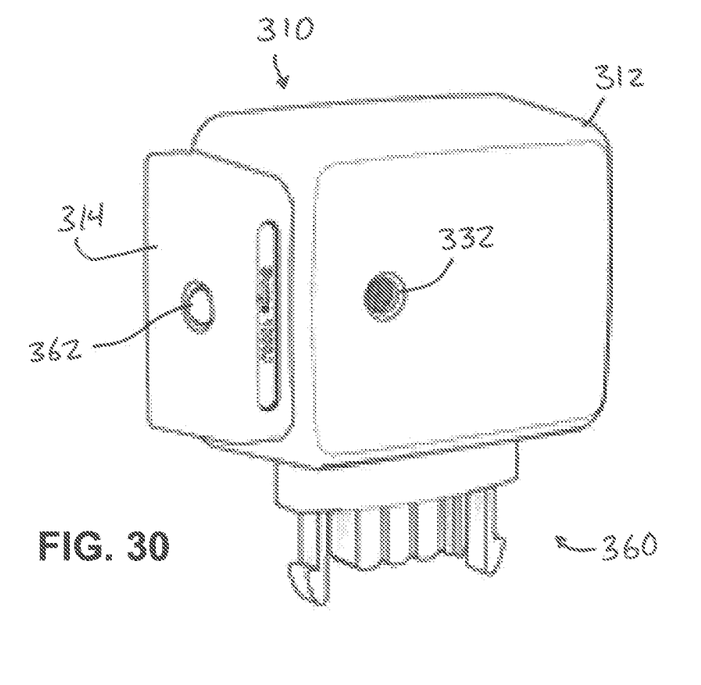
FIG. 30 is a front perspective view of another electrical plug, for output to a modular electrical system, with replaceable surge protector in accordance with the present invention.

Surge protector cartridge 14 remains accessible along an exterior of the plug housing 12 when fully inserted into recess 28, and is readily replaceable in the event of an electrical surge that causes surge protector circuitry 22 to no longer offer surge protection. Referring to FIGS. 20-22, plug housing 12 is made up of a main housing portion 12a that cooperates with a rear housing or cover portion 12b and a bottom housing or cover portion 12c to enclose a main circuit board 29a and a pair of secondary circuit boards 29b, 29c, which will be described in more detail below. The mating surfaces of housing portions 12a-c include cooperative channels and ridges that seat together during assembly to ensure proper alignment, and to optionally provide surface area for ultrasonic welding, adhesives, or the like. Screw fasteners may optionally be used to secure the housing portions together. Main housing portion 12a and rear cover portion 12b cooperate to define a strain relief portion 27 that impinges upon an outer jacket of cord 20 during assembly. Cord 20 may include a collar or band 25 that helps to ensure the cord 20 cannot be pulled from main housing 12. Two-piece housing 31 of surge protector cartridge 14 includes a main surge protector housing portion 31a and a cover portion 31b that cooperates to enclose surge protector circuitry 22. Similar to housing portions 12a-c, the mating surfaces of surge protector housing portions 31a-b include cooperative channels and ridges that seat together during assembly.

Optionally, a circuit breaker 30 is provided along plug housing 12, and is operable to selectively break or open electrical continuity between the electrical prongs 16 and the electrical cord 20 in response to a current overload condition present at the electrical cord 20, such as due to an electrical short at a downstream end of the cord, or due to an appliance or device requiring or otherwise drawing more electrical current than that for which electrical plug assembly 10 is designed. Referring to FIGS. 20-22, circuit breaker 30 has a pair of blade contacts 33 that are received in respective female terminals 35 mounted at the secondary board 29b.

The other secondary board 29c supports female terminals or contacts 26 that are engaged by the surge protector contacts 24 of cartridge 14.

An indicator in the form of a color-changing light 32 provides users with an indication of the plug assembly's status when it is plugged into a live receptacle 18 such as shown in FIGS. 1 and 2. Light 32 illuminates in one color (such as green) when electrical cord 20 is electrically energized with surge protection available from the surge protector cartridge 14, and illuminates in a different color (such as red) when electrical cord 20 is electrically energized with surge protection not available from the surge protector cartridge 14. Other forms of indicia are envisioned, such as solid or blinking lights of one or more colors, audible tones, and the like.

Figure 31:
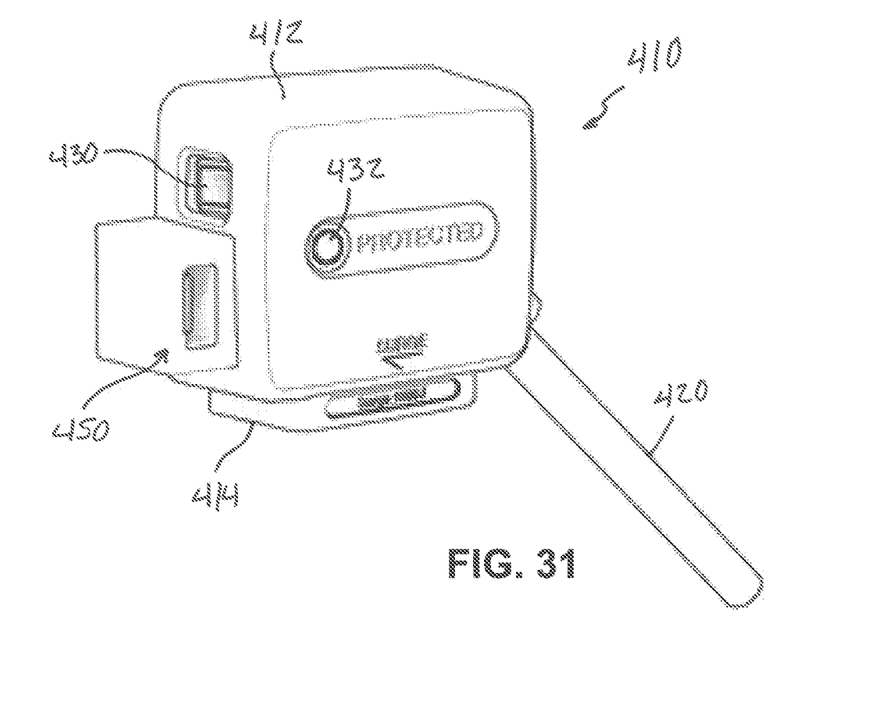
FIG. 31 is a front perspective view of another electrical plug with low voltage USB power receptacle and replaceable surge protector in accordance with the present invention.

Alternative arrangements of electrical plug assemblies include, for example, an in-line electrical surge protector assembly 110 that is mounted along and between a flexible electrical input cord 120a and a flexible electrical output cord 120b (FIG. 28), an electrical plug assembly 210 with pass-through AC outlet 250 (FIG. 29), an electrical plug assembly 310 configured to supply power to a modular electrical system (FIG. 30), and an electrical plug assembly 410 with low voltage DC receptacle 450 (FIG. 31). The surge protection and circuit breaker functions of each of the assemblies 110, 210, 310, 410 is substantially the same as for electrical plug assembly 10 discussed above, and will therefore not be repeated herein. In addition, it will be understood that components of the additional assemblies of FIGS. 28-31 are assigned reference numerals that correspond to like components of the plug assembly 10, with the addition of 100, 200, 300, or 400, so that they may be readily understood with reference to the earlier descriptions.

In-line electrical surge protector assembly 110 (FIG. 28) receives power from flexible electrical input cord 120a having a conventional plug assembly 140 with set of prongs 116 at one end, the electrical output cord 120b exiting an opposite side of the surge protector assembly 110 and providing electrical power to an electrical consumer (not shown). The power supplied to the consumer by output cord 120b is overload-protected by a circuit breaker 130, and surge-protected by a surge protector cartridge 114, both of which are at the surge protector assembly 110. Aside from the physical separation between the plug assembly 140 with prongs 116, and the surge protector assembly 110, the functional aspects are identical or substantially identical to surge protector assembly 10 described above. It will further be appreciated that substantially any style of power-receiving connector may be used in place of plug assembly 140, including any country-specific plug, or a proprietary modular electrical connector. The plug assembly 140 may also be omitted and the individual wires of the input cord end left exposed for hard-wired applications, or fitted with individual electrical terminals.

Electrical plug assembly 210 (FIG. 29) is substantially identical to surge protector assembly 10, but includes pass-through AC outlet 250 so that plug assembly 210 permits another electrical consumer with compatible plug to be plugged into the AC outlet 250 in a front face of the assembly's housing 212. The pass-through AC outlet 250 may be surge and breaker-protected just like the conductors of electrical cord 220, or may be directly coupled to the plug prongs (not shown) of plug assembly 210 so as to bypass the surge and overload protections provided to cord 220 and electrical consumers connected thereto.

Modular electrical plug assembly 310 (FIG. 30) is substantially identical to surge protector assembly 10, but instead of having an electrical cord 20 exiting its housing 312, a specialized modular electrical connector 360 is provided to supply electrical power only to a compatible modular electrical connector and associated cord or other conductor (not shown). An optional surge cartridge protection indicator light 362 is provided directly at the surge cartridge 314, and may provide a visual indication of an incremental level of surge protection available, for example.

Figure 32:
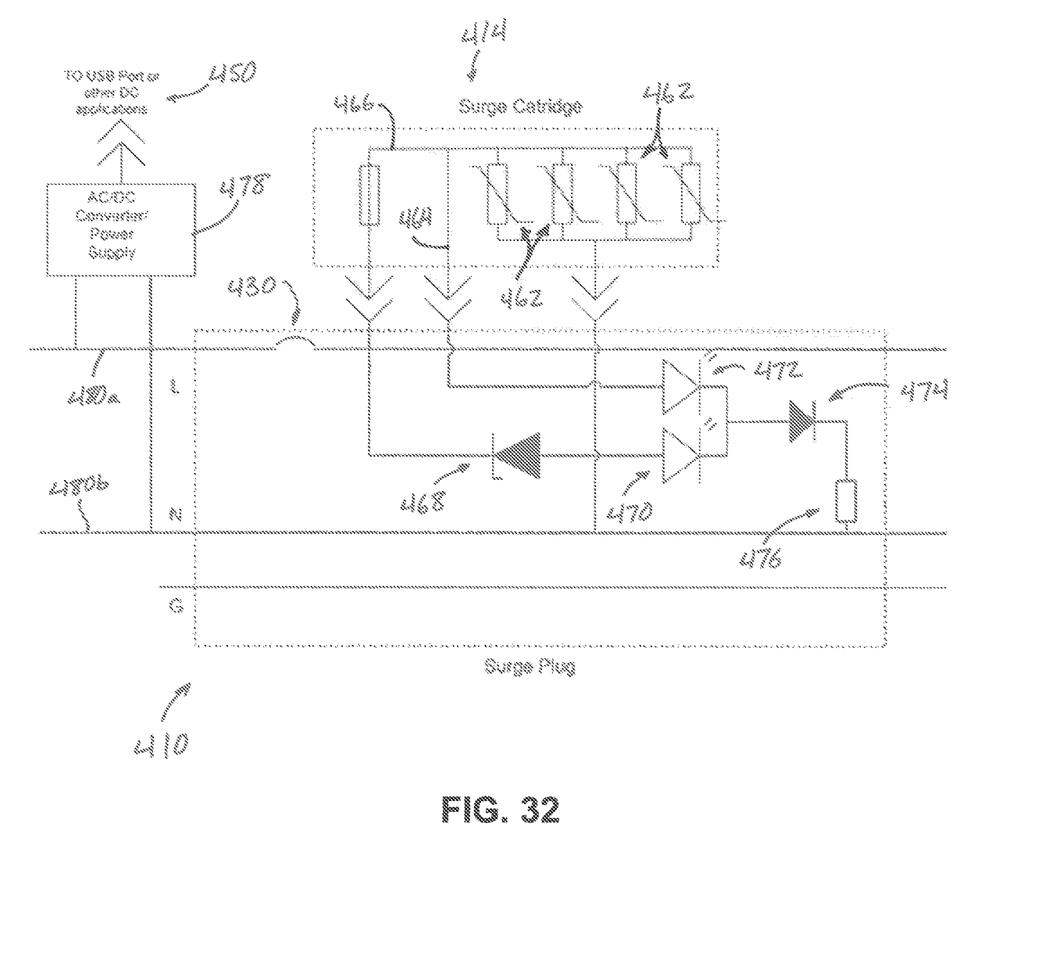
FIG. 32 is a simplified electrical circuit diagram of the electrical plug, receptacle, and surge protector of FIG. 31.

Electrical plug assembly 410 (FIG. 31) is substantially identical to surge protector assembly 10, but includes a low voltage DC receptacle 450 (such as a USB-style receptacle) with associated circuitry shown in FIG. 32. DC receptacle 450 provides electrical power to electrical charging cords and other devices, typically smaller portable electronic devices. Referring now to the simplified circuit diagram of FIG. 32, surge protector cartridge 414 includes a plurality of varistors 462 coupled in parallel, which are capable of absorbing spikes in the electrical supply. For example, four varistors 462 may be capable of absorbing a total of about 1000 Joules. Output from the varistors 462 is to a surge indicator conductor 464 and a fused conductor 466. A Zener diode 468 selectively allows power through to a fused LED lamp indicator 470, while an adjacent LED lamp indicator 472 (similar or equivalent to indicator light 32 described above) provides a surge protection status indication. A standard diode 474 and fuse 476 provide reverse polarity protection, and an AC to DC electrical power converter 478 receives high voltage AC power from line and neutral conductors 480a, 480b and supplies lower voltage (such as 5V to 12V) DC power to the low voltage DC receptacle 450.

Other features that may be incorporated in the electrical assemblies include power quality monitoring and logging capabilities, providing notification when a surge is experienced, monitoring percentage of surge-absorption capability remaining in the cartridge, logging the number of surges experienced, time-based cartridge replacement schedules in which cartridges are replaced on a set schedule rather than on a one-by-one as-needed basis, and wireless communications of on/off controls and/or data tracking via Bluetooth®, WiFi, WiFi switch capabilities, replaceable plugs and/or receptacles or terminals at the output end of the surge-protected cord or conductors for use in different countries, and circuitry for use with different voltage supplies. Other options contemplated include providing only surge protection without a circuit breaker, a removable cord that can be disconnected and plugged into other outlets, rather than permanently mounted to the surge protector plug assembly. The various features of the electrical plug assemblies disclosed herein may be applied to multi-circuit applications, may have a surge protector cartridge that is separated by some distance from a plug head, may utilized an IEC plug for use in a computer server rack, etc.

Therefore, the replaceable-cartridge surge protector is capable of providing continuous electrical power to one or more electrical devices, circuits, or the like, and may do so with surge protection circuitry that is readily replaceable by users to ensure continuous and ongoing surge protection without need for replacing cords or surge-protecting power strips. Users may be notified of the need to replace the cartridge by an indicator on the unit itself, or by an electronic data signal sent by the unit to a receiving computer that generates a message or indicia. By keeping a supply of compact surge protector cartridges on hand, the surge-protected devices in a work area, dwelling, or the like may have their surge protection capacity quickly restored after a surge event. Optionally, replacement surge protector cartridges may be distributed to users on a subscription basis, and replaced on a determined schedule regardless of condition, to help ensure the availability of maximum surge protection at substantially all times.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. An electrical surge protector system comprising:
   electrical input conductors;
   a housing defining a cavity containing power circuitry that receives power from said electrical input conductors, said power circuitry comprising:
      an electrical power output for directing electrical power from said electrical input conductors to an electrical consumer; and
      a plurality of electrical contacts recessed in said cavity and in electrical communication with said electrical input conductors;
   a surge protector cartridge comprising:
      a surge protector housing insertable into said cavity;
      surge protector circuitry disposed in said surge protector housing; and
      a plurality of surge protector contacts in electrical communication with said surge protector circuitry and configured to engage said plurality of electrical contacts at said housing;
   wherein said power circuitry is configured to maintain electrical continuity from said electrical input conductors to said electrical power output after either (i) said surge protector circuitry has absorbed an electrical surge at said electrical input conductors, or (ii) after removal of said surge protector cartridge from said cavity.

2. The electrical surge protector system of claim 1, wherein said surge protector cartridge includes an insertion portion supporting said plurality of surge protector contacts and insertable into said cavity, and a gripping portion that remains outside of said cavity to facilitate replacement of said surge protector cartridge.

3. The electrical surge protector system of claim 1, wherein said electrical power output comprises an electrical output cord extending outwardly from said housing.

4. The electrical surge protector system of claim 3, wherein said electrical input conductors comprise an input electrical cord extending to said power circuitry in said housing.

5. The electrical surge protector system of claim 4, wherein said electrical input conductors further comprise an electrical plug configured to receive electrical power from a corresponding electrical supply outlet, said electrical plug coupled to said input electrical cord.

6. The electrical surge protector system of claim 3, wherein said electrical output cord has an opposing end opposite said housing, and wherein said opposing end terminates with at least one chosen from (i) bare wires, (ii) electrical terminals of an electrical appliance, (iii) a NEMA 5-15 receptacle, (iv) an IEC C5 connector, (v) an IEC C7 connector, and (vi) an IEC C13 connector.

7. The electrical surge protector system of claim 3, further comprising a circuit breaker at said housing, wherein said circuit breaker is configured to selectively break the electrical continuity between said electrical input conductors and said electrical output cord in response to a current overload condition present at said electrical output cord.

8. The electrical surge protector system of claim 1, further comprising an indicator configured to generate indicia indicating when said electrical power output is electrically energized with surge protection available from said surge protector cartridge, and further indicating when said electrical power output is electrically energized with surge protection not available from said surge protector cartridge.

9. An electrical plug and surge protector comprising:
a plug housing defining a cavity;
a pair of electrical prongs extending outwardly from said plug housing for receiving electrical power from an outlet;
an electrical power output for directing electrical power from said pair of electrical prongs to an electrical consumer;
a plurality of electrical contacts recessed in said cavity and in electrical communication with said pair of electrical prongs; and
a surge protector cartridge comprising:
 a surge protector housing insertable into said cavity;
 surge protector circuitry disposed in said surge protector housing; and
 a plurality of surge protector contacts in electrical communication with said surge protector circuitry and configured to engage said plurality of electrical contacts at said plug housing;
wherein said electrical plug is configured to maintain electrical continuity from said pair of electrical prongs to said electrical power output after either (i) said surge protector circuitry has absorbed an electrical surge at said pair of electrical prongs, or (ii) after removal of said surge protector cartridge from said cavity.

10. The electrical plug and surge protector of claim 9, wherein said surge protector cartridge includes an insertion portion supporting said plurality of surge protector contacts and insertable into said cavity, and a gripping portion that remains outside of said cavity to facilitate replacement of said surge protector cartridge.

11. The electrical plug and surge protector of claim 9, wherein said electrical power output comprises an electrical cord extending outwardly from said plug housing.

12. The electrical plug and surge protector of claim 11, wherein said electrical cord has an opposing end opposite said plug housing, and wherein said opposing end terminates with at least one chosen from (i) bare wires, (ii) electrical terminals of an electrical appliance, (iii) a NEMA 5-15 receptacle, (iv) an IEC C5 connector, (v) an IEC C7 connector, and (vi) an IEC C13 connector.

13. The electrical plug and surge protector of claim 12, further comprising a circuit breaker at said plug housing, wherein said circuit breaker is configured to selectively break the electrical continuity between said pair of electrical prongs and said electrical cord in response to a current overload condition present at said electrical cord.

14. The electrical plug and surge protector of claim 9, further comprising an indicator configured to generate indicia indicating when said electrical power output is electrically energized with surge protection available from said surge protector cartridge, and further indicating when said electrical power output is electrically energized with surge protection not available from said surge protector cartridge.

15. An electrical plug and surge protector comprising:
a plug housing;
at least two electrical prongs extending outwardly from said plug housing;
an electrical cord extending outwardly from said plug housing and in electrical communication with said at least two electrical prongs;
a plurality of electrical contacts at said plug housing and in electrical communication with said at least two electrical prongs; and
a surge protector cartridge having a surge protector housing, surge protector circuitry disposed in said surge protector housing, and a plurality of surge protector contacts in electrical communication with said surge protector circuitry and configured to engage said plurality of electrical contacts at said plug housing;
wherein said surge protector circuitry is configured to absorb an electrical surge at said at least two electrical prongs and said electrical plug is configured to maintain electrical continuity from said at least two electrical prongs to said electrical cord both before and after said surge protector circuitry has absorbed-an the electrical surge; and
wherein said surge protector cartridge is accessible along an exterior of said plug housing and is replaceable at said plug housing.

16. The electrical plug and surge protector of claim 15, wherein said plug housing defines a recess for receiving a portion of said surge protector cartridge, and said plurality of electrical contacts of said plug housing are recessed within said recess, wherein said plurality of surge protector contacts are received by said plurality of electrical contacts of said plug housing when said portion of said surge protector cartridge is inserted into said recess.

17. The electrical plug and surge protector of claim 15, further comprising a circuit breaker at said plug housing, wherein said circuit breaker is configured to selectively break the electrical continuity between said at least two electrical prongs and said electrical cord in response to a current overload condition present at said electrical cord.

18. The electrical plug and surge protector of claim 15, further comprising an indicator configured to generate indicia indicating when said electrical cord is electrically energized with surge protection available from said surge protector cartridge, and further indicating when said electrical cord is electrically energized with surge protection not available from said surge protector cartridge.

19. The electrical plug and surge protector of claim 18, wherein said indicia comprises a light capable of displaying different colors.

20. The electrical plug and surge protector of claim 15, wherein said electrical cord has an opposing end opposite said plug housing, and wherein said opposing end terminates with at least one chosen from (i) bare wires, (ii) electrical terminals of an electrical appliance, (iii) a NEMA 5-15 receptacle, (iv) an IEC C5 connector, (v) an IEC C7 connector, and (vi) an IEC C13 connector.

* * * * *

UNITED STATES PATENT AND TRADEMARK OFFICE
CERTIFICATE OF CORRECTION

| | | |
|---|---|---|
| PATENT NO. | : 12,057,667 B2 | Page 1 of 1 |
| APPLICATION NO. | : 17/740797 | |
| DATED | : August 6, 2024 | |
| INVENTOR(S) | : Yiqi Wang et al. | |

It is certified that error appears in the above-identified patent and that said Letters Patent is hereby corrected as shown below:

In the Claims

Column 8, Claim 15:
Line 24, delete "-an" after --absorbed--

Signed and Sealed this
Third Day of September, 2024

Katherine Kelly Vidal
*Director of the United States Patent and Trademark Office*